US011685091B2

(12) United States Patent
Naboni et al.

(10) Patent No.: US 11,685,091 B2
(45) Date of Patent: Jun. 27, 2023

(54) THERMOREGULATED RUBBER DISTRIBUTOR FOR INJECTION MOLDS

(71) Applicant: NCN Technology S.R.L, Sarnico (IT)

(72) Inventors: Andrea Naboni, Palosco (IT); Guido Michael Castoldi, Palosco (IT)

(73) Assignee: NCN TECHNOLOGY S.R.L., Palosco (IT)

( * ) Notice: Subject to any disclaimer, the term of this patent is extended or adjusted under 35 U.S.C. 154(b) by 34 days.

(21) Appl. No.: 17/056,304

(22) PCT Filed: Apr. 10, 2019

(86) PCT No.: PCT/IB2019/052958
§ 371 (c)(1),
(2) Date: Nov. 17, 2020

(87) PCT Pub. No.: WO2019/224621
PCT Pub. Date: Nov. 28, 2019

(65) Prior Publication Data
US 2021/0213660 A1 Jul. 15, 2021

(30) Foreign Application Priority Data
May 23, 2018 (IT) .......................... 102018000005633

(51) Int. Cl.
B29C 45/27 (2006.01)

(52) U.S. Cl.
CPC ...... B29C 45/2727 (2013.01); B29C 45/2738 (2013.01); B29C 45/2756 (2013.01); B29C 2045/2733 (2013.01)

(58) Field of Classification Search
CPC .................. B29C 45/2727; B29C 45/2738
(Continued)

(56) References Cited

U.S. PATENT DOCUMENTS 4,761,343 A * 8/1988 Gellert .................... B29C 45/30
264/328.8
5,032,078 A * 7/1991 Benenati ............. B29C 45/2727
425/572
(Continued)

FOREIGN PATENT DOCUMENTS

KR          778090 B1    11/2007
KR       2007112921 A    11/2007
(Continued)

OTHER PUBLICATIONS

Volume Formulas: Parallepiped: Math.com Math Problems, Tests, Forums; http://web.archive.org/web/20131124163444/https://www.math10.com/en/geometry/volume.html (Year: 2013).*
(Continued)

Primary Examiner — Matthew J Daniels
Assistant Examiner — Wayne K. Swier
(74) Attorney, Agent, or Firm — GableGotwals

(57) ABSTRACT

A rubber distributor for injection molds wherein the distributor comprises two or more modular units, sleeves each interchangeably insertable in a modular unit, one or more injectors to feed melted rubber to the distributor and one or more discharge nozzles to discharge the melted rubber from the distributor towards an external mold. Each sleeve has a through hole extending along the longitudinal axis of the same sleeve. Sleeves have a groove extending over respective side surfaces. Groove and the inner surface of the respective housing in the modular unit define a coil that can be supplied with a thermoregulating fluid whenever the sleeve is inserted into a modular unit. The modular units can be constrained to one another to define one or more channels for distribution of melted rubber that extend from an injector to one or more discharge nozzles, depending on a desired path. Modularity of the units allows the distributor to have ducts for distribution of melted rubber of a desired geometry.

(Continued)

Through holes of the sleeves define corresponding lengths of at least one channel for distribution of melted rubber. Since the sleeves are cooled and the melted rubber flows inside them, the distributor is thermoregulated.

12 Claims, 7 Drawing Sheets

(58) Field of Classification Search
USPC .......................................................... 425/549
See application file for complete search history.

(56) References Cited

U.S. PATENT DOCUMENTS

| | | | |
|---|---|---|---|
| 5,147,663 A * | 9/1992 | Trakas | ................ B29C 45/2727 425/572 |
| 6,149,423 A | 11/2000 | Manz | |
| 6,179,603 B1 * | 1/2001 | Kring | .................. B29C 45/2608 425/572 |
| 2007/0082081 A1 * | 4/2007 | Feick | .................. B29C 33/0083 425/549 |
| 2010/0183763 A1 | 7/2010 | Babin et al. | |

FOREIGN PATENT DOCUMENTS

| | | |
|---|---|---|
| KR | 805081 B1 | 2/2008 |
| KR | 1000357 B1 | 12/2010 |
| WO | 2010028465 A2 | 3/2010 |

OTHER PUBLICATIONS

Characteristics of Adhesive Materials—Sina Ebnesajjad Phd, Arthur H. Landrock in Adhesives Technology Handbook (Third Edition), 2015 5.51 Thermoplastic Rubber (For Use in Adhesives). https://www.sciencedirect.com/topics/engineering/thermoplastic-rubber (Year: 2015).*

* cited by examiner

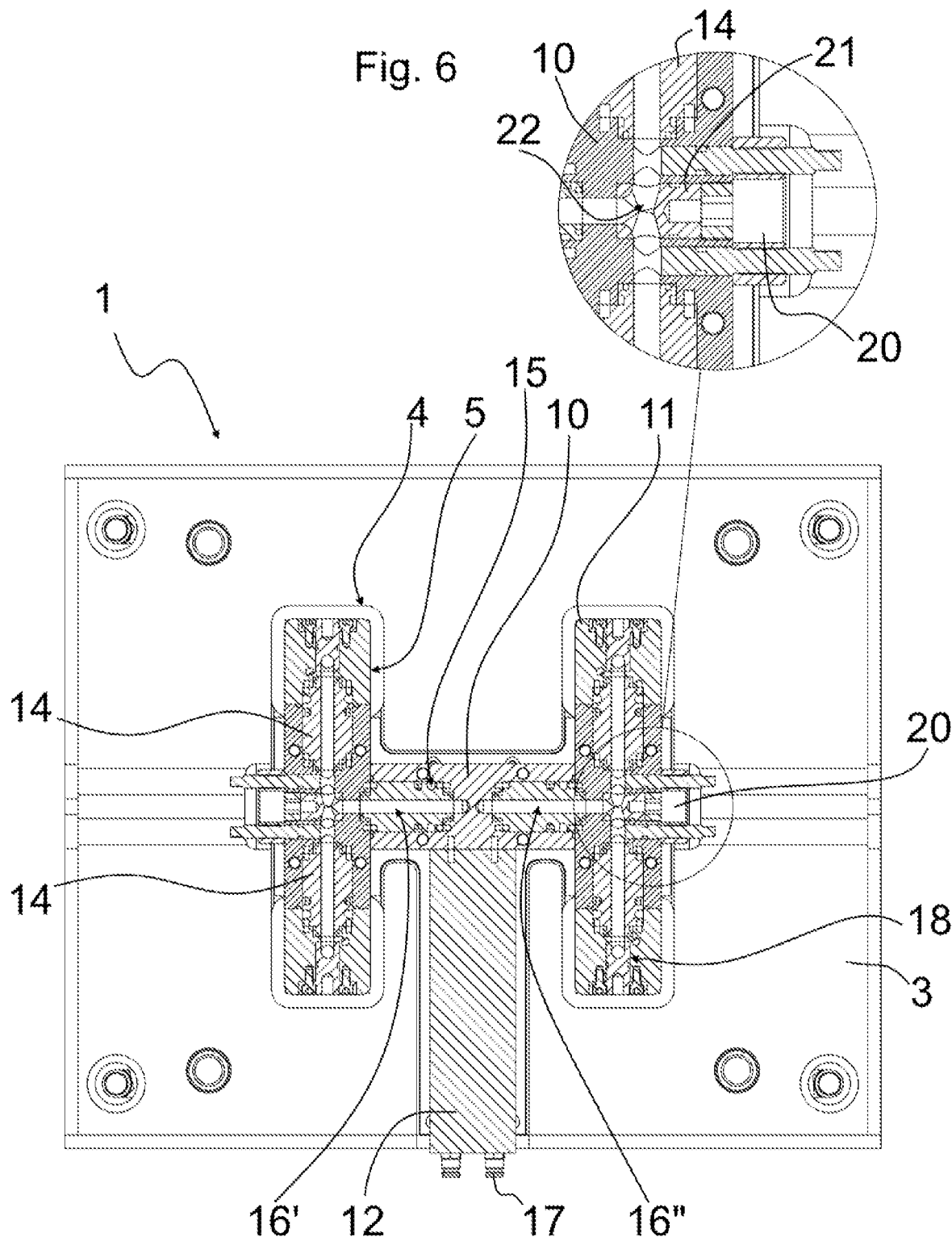

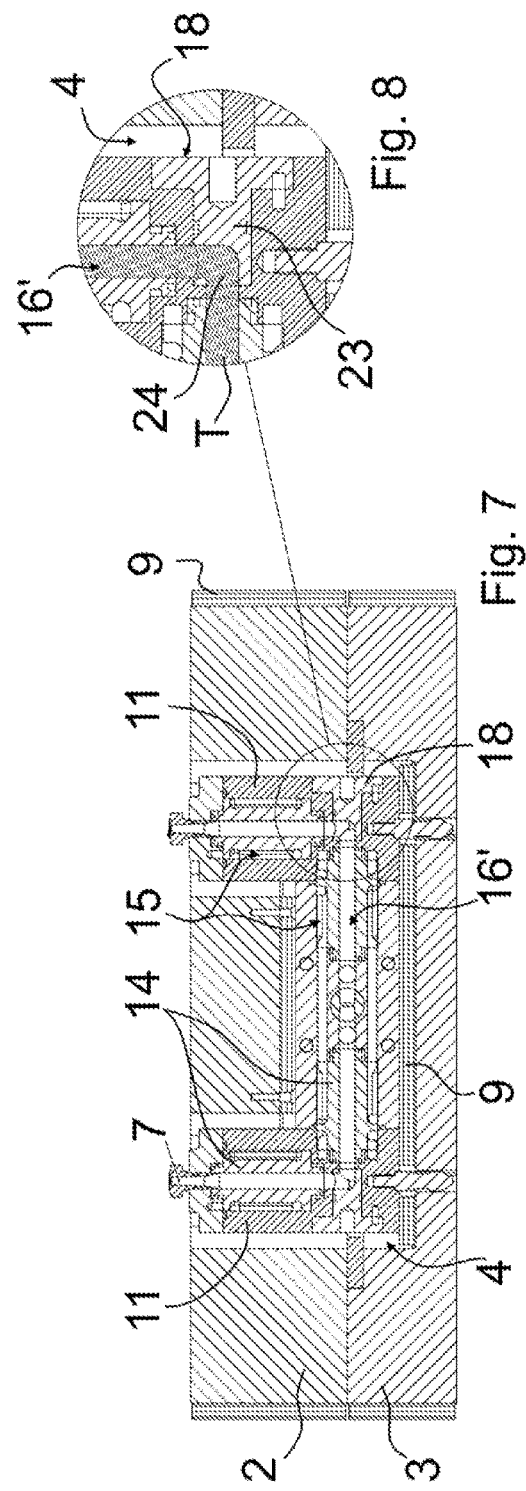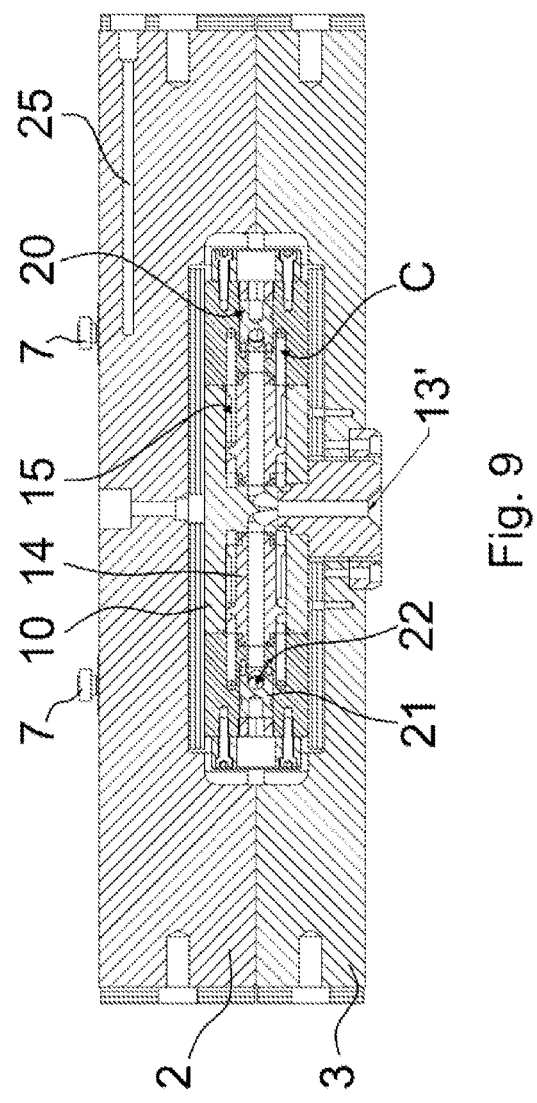

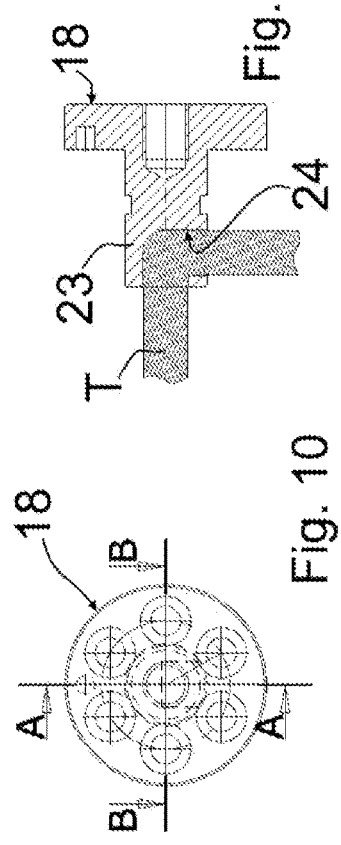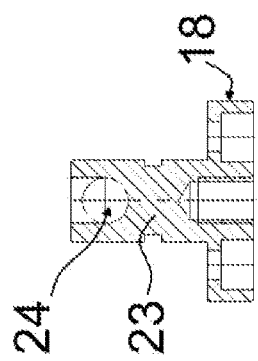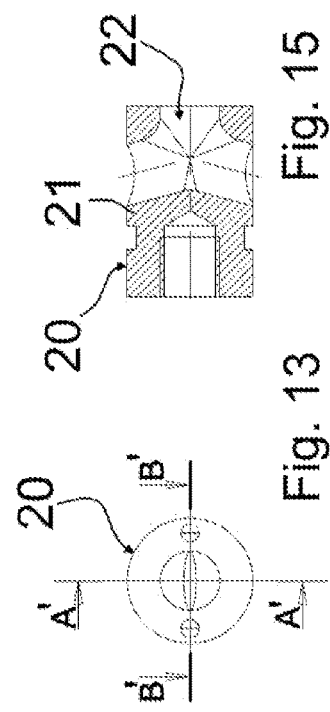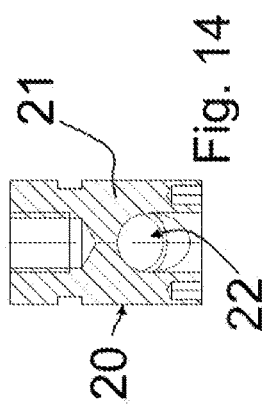

THERMOREGULATED RUBBER DISTRIBUTOR FOR INJECTION MOLDS

CROSS-REFERENCE TO RELATED APPLICATIONS

This United States application is the National Phase of PCT Application No. PCT/IB2019/052958 filed 10 Apr. 2019, which claims priority to Italian Patent Application No. 102018000005633 filed 23 May 2018, each of which is incorporated herein by reference.

FIELD OF THE INVENTION

The present invention concerns a thermoregulated rubber distributor for injection molds, i.e. a distributor intended to equip an injection mold for rubber manufactured products.

STATE OF THE ART

As is known, there substantially are three techniques for molding vulcanized rubber manufactured products: compression molding, transfer molding and injection molding.

In injection molding, the rubber is injected hot, at the melted state and under pressure, into a mold, where it is vulcanized to mold the final manufactured item, by means of an extruder. The mold consists of two mold halves, which together define the impression or shape of the manufactured product. In turn, the two mold halves are coupled to corresponding plates of a press, for example hydraulic, so that the mold can be closed from the moment a new rubber injection is carried out, and opened to allow the ejecting of the vulcanized rubber manufactured product.

Inserts, for example of a metal or plastic material, which are intended to be incorporated into the rubber manufactured products, can be inserted inside the mold.

The extruder, which also acts as a piston to inject the rubber into the mold, operates at very high pressures, which can reach 2500-3000 bars.

The press, inside which the mold is mounted, applies a high pressure onto the closed mold halves, which can reach the value of 800 tons. Usually, the press comprises a stationary plate and a mobile plate, translatable towards and away from the stationary plate, between a distal position corresponding to the open mold, and a proximal position corresponding to the closed mold. However, presses in which both the plates are mobile are also known. The press is indifferently shaped with a horizontal opening of the mold (the plates of the press are vertical) or with a vertical opening of the mold (the plates of the press are horizontal).

The injection of a measured quantity of rubber, named melted rubber, occurs when the mold is closed by means of a system of distribution channels (distribution runners/injection runners) which develop through a dedicated plate adjacent to one of the mold halves, named thermoregulated cold runner block, until reaching nozzles for the injection of the melted rubber into the mold. Traditionally, the distribution channels are obtained by drilling the cold runner block, and therefore with material removal (deep drilling).

At the start of a new injection cycle, an injector fed by the extruder is sealingly connected to the distribution channel system to achieve the fluid connection and to allow the melted rubber to contemporaneously reach all of the distribution channels and, finally, to fill the mold through the nozzles, one for each distribution channel, which are inserted in the mold. Generally, the injector is central with respect to the distribution channels, so that the melted rubber flows through the distribution channels at the same speed and at the same flow rates.

For example, some mold manufacturers are Klöckner DESMA Elastomertechnik GmbH (Germany), Aspem Ferramentaria (Brazil), Rutil S.r.l. (Italy), Elmet Elastomere Produktions and Dienstleistungs GmbH (Austria). In particular, some demonstration videos are shown on the Element website.

Generally, the press is accessorized with heating plates whose task is to maintain the temperature of the mold within a temperature range at which the rubber vulcanizes, usually 150-225° C.; the temperature range depends on the characteristics of the rubber injected from time to time. The heating plates are prearranged between a plate of the press and the corresponding mold half, in contact therewith.

A thermally insulating plate is often provided between the cold runner block and the adjacent thermoregulated heating plate. In fact, the cold runner block is in turn accessorized with a thermoregulating system whose task is to maintain the temperature inside the distribution channels between a range of 70-90° C., i.e. a range within which the rubber cannot vulcanize.

In practice, for each mold half, the press comprises a corresponding heating plate (electrically heatable), which exchanges heat with the relative mold half. The presence of thermoregulated heating plates is necessary to allow the vulcanization of the rubber inside the mold; the cooling system of the cold runner block is instead used, following the opening of the mold and prior to a new rubber injection—i.e. after each molding cycle-, to prevent the rubber that remained inside the distribution channels from vulcanizing or anyhow thickening, thus obstructing the channels themselves and preventing carrying out new molding cycles. In other words, the thermoregulating action of the cold runner block maintains the melted rubber, inside the distribution channels, in conditions such as to be able to be used at each molding cycle, i.e. sufficiently fluid.

Some examples of known solutions of the art are described in KR1000357(B1), KR778090(B1), KR2007112921(A), KR805081(B1) and especially in WO 2010/028465.

The products that can be obtained with the described technique can be of various types and intended for different purposes: gaskets, shoe soles, dolls, inserts, etc.

One of the most important drawbacks observed so far consists in the difficult cleaning of the distribution channels. In fact, after a certain number of molding cycles, residues of melted rubber, which must be removed, accumulate inside the distribution channels despite the thermoregulating action of the cold runner block. The residues adhere strongly to the inner walls of the distribution channels, thus reducing the effective section. At a certain point, it is thus necessary to disassemble the cold runner block and to subject it to long and expensive cleaning operations based on the use of caustic soda, ultrasounds, drilling, sandblasting and rinsing in an antioxidizing oil bath before being able to mount it back on the press. Sandblasting effectively removes the residues, but wears the inner surfaces of the distribution channels over time and modifies their geometry; instead, the use of aggressive products, such as soda, does not in turn allow to remove all the residues in the most difficult-to-reach points, considering the distribution channels develop inside the cold runner block.

Typically, the cleaning operations of the distribution channels are necessary when the nature of the melted rubber is modified, i.e. when a rubber with different characteristics must be used.

One of the solutions suggested to partially compensate for the problem is to make the cold runner block in two separable plates, so that, once open, the two halves of the distribution channels are directly accessible on each plate for cleaning from above.

A further solution is the one suggested by Aspem Ferramentaria in WO 2010/028465: the distribution channels are defined inside a distributor which is in turn interchangeably insertable inside the cold runner block. In other words, the cold runner block is configured as metal housing of the distributor which, in turn, defines the distribution channels. The distributor has no thermal inertia because its mass is minimum, given it only contains the distribution channels and the relative thermoregulating system (coils), whereas the thermal inertia necessary for the operation is provided by the cold runner block, a steel plate of greater mass, in which the distributor is insertable. More simply, the distribution channels are extractable from the cold runner block, this allows to considerably simplify the cleaning and maintenance operations of the distribution channels and the relative thermoregulating system.

The Applicant has found that the solution described in WO 2010/028465 can be perfected because this solution, although going in the right direction, does not allow to reduce the design and construction costs of the cold runner block. In fact, the distributor must be designed from scratch, from time to time, and implemented with mechanical processes in a customized way for each mold. It is instead desirable to be able to implement the cold runner block and the corresponding distributor with great versatility, quickly and at low costs.

SUMMARY OF THE INVENTION

Object of the present invention is thus to provide a thermoregulated rubber distributor for injection molds that is simple to design and implement, quickly and at low costs, independently from the desired final geometry of the distribution channels, i.e. a more versatile distributor with respect to known solutions.

In one of its first aspects, the present invention thus concerns a for injection molds.

In particular, the rubber distributor comprises one or more modular units, sleeves each interchangeably insertable in a modular unit, one or more injectors to feed melted rubber to the distributor and one or more discharge nozzles to discharge the melted rubber towards an external mold.

Each sleeve has a through hole extending along the longitudinal axis of the sleeve itself, i.e. these are hollow sleeves.

Moreover, the sleeves have at least one groove extending on the relative side surface, for example a groove milled in the outer surface of the sleeves. Thanks to this detail, when a sleeve is inserted inside a modular unit, the groove of the sleeve itself and the inner surface of the relative housing inside the modular unit define a coil able to be supplied with a thermoregulating fluid. In other words, the sleeves are cooled thanks to a coolant flowing in the coil just described, removing heat from the sleeve.

The modular units can be constrained to one another to define one or more channels for the distribution of the melted rubber that extend from an injector to one or more of the discharge nozzles, depending on the desired path. Therefore, the modularity of the units allows to achieve the distributor with ducts for the distribution of the melted rubber of the desired geometry. In fact, the through holes of the sleeves define corresponding lengths of said at least one channel for the distribution of the melted rubber. Given that the sleeves are cooled, and that the melted rubber flows inside them, the distributor is thermoregulated.

Many advantages are offered by the solution just described.

For example, unlike the solution described in WO 2010/028465, the distributor according to the present invention is modular by using the modular units as construction bricks, and this avoids the high design and implementation costs that a customized solution usually entails. In other words, the distributor according to the present invention can be achieved with the desired number and path of channels for the distribution of the rubber, by using the modular elements, without having to use components designed and made from time to time for each new mold.

A further advantage consists in the low weight of the single modular units: given that the distributor can be separated in its modular units, whenever one or more units have to be replaced, they can be shipped worldwide without having to ship a whole complete distributor, with clear advantages in terms of cost.

A further advantage consists in the simplicity of the maintenance which the distributor according to the present invention allows: when a part of the distributor has to be replaced, it is sufficient to only replace the modular units affected by the technical problem and not the whole distributor. Moreover, the cleaning of the distribution channels is extremely simple: if the rubber vulcanizes in the distribution channels, the distributor can be completely or partially disassembled and the modular units can be cleaned very easily, thus avoiding sandblasting, deep drilling (which often involves the warping of the bits), etc.

A further advantage consists in the reduced cost of production with respect to a customized solution such as the one described in WO 2010/028465. Starting from the modular units, the distributor is modular at low costs and this makes the use of two distributors instead of one attractive. Thus, when it is necessary to clean a distributor, the cold runner block can be opened, and instead of proceeding with the cleaning of that distributor, one can proceed by installing a second clean backup distributor to immediately restart the production; the replaced distributor can thus in turn be calmly cleaned and then made available as backup distributor.

Preferably, the distributor comprises at least one connection element provided with a portion insertable in a modular unit, in-between two sleeves, to intercept the distribution channel defined by the sleeves. A through hole is obtained in the insertable portion of the connection element, to set two consecutive through holes of the two sleeves in fluid communication, and to allow the passage of the melted rubber. The hole of the connection element can be rectilinear or curved to connect lengths of the distribution channel that can either be aligned or not, for example to connect a horizontal length to a vertical length.

Preferably, the connection element is a cap that can be sealingly screwed to a modular unit to prevent the rubber from coming out of the distributor. The connection element, or cap, can be unscrewed from the modular unit to extract any tubular cured rubber element formed in the corresponding intercepted distribution channel. In other words, the connection element, or cap, is configured as a fairlead element; in the circumstance in which, despite the thermoregulation of the distributor, the melted rubber inside a distribution channel cures, it is simply possible to unscrew the connection element intercepting that distribution channel and to extract from the distributor the tubular cured rubber element passing through the hole of the connection element, like a thread through the eye of the needle. This detail considerably simplifies the cleaning of the distributor. Considering that the connection elements, or caps, such as those just described are also used in rubber distributors according to the known art, the Applicant reserves the right to file a divisional patent application for them.

Preferably, the dimensions of the connection elements are so that the extent of the insertable portion is negligible with respect to the extent of the distribution channels inside the distributor, which are in turn defined by the through holes of the sleeves, so that the distribution channels of the rubber are thermoregulated throughout most of their extent, considering that the coils extend circumferentially around the sleeve, but not around the connection elements, even if the possibility to also extend the coils over the connection elements should not be excluded if needed.

Preferably, the groove described above extends over the outer surface of the sleeves, for example defining a fret-like path that substantially covers all of the surface of the sleeve, between an initial point and a final point. The modular units have a housing, in practice a hole with an inner diameter corresponding to the outer diameter of the sleeves, in which at least one sleeve is insertable removably, and the groove and inner surface of the housing define the coil. A thermoregulating fluid that exchanges heat with the sleeve is fed to the coil, and in particular enters the coil at the initial point mentioned above and leaves the coil at the final point. Thus, in practice, the sleeves operate as heat exchangers to prevent the vulcanization of the rubber in the through holes therein, i.e. in the longitudinal holes that together define a distribution channel.

In the preferred embodiment, the sleeves are substantially cylindrical and hollow, and preferably are provided with sealing gaskets, for example of the O-ring type, on their respective ends, so that two or more sleeves can be stacked, head to head, in a modular unit.

Preferably, the modular units are parallelepiped shaped and the relative thickness between the housing of the sleeves and the outer surface is smaller than the radius of the housing. In other words, the sleeves occupy most of the inner volume of the modular units. For example, the modular units are made of steel. As will be explained more in detail hereinafter, in relation to a second aspect of the present invention, the fact of having reduced the thickness of the modular units to a minimum allows to achieve important advantages, taking care to insert the distributor in an assembly of plates in which the thermal inertia is assigned to the plates.

By constructing the modular units with minimum thicknesses, and with large housings for the sleeves, the latter can have the maximum diameter possible, a circumstance which corresponds to having the maximum surface of heat exchange available for the thermoregulating fluid, to the advantage of the heat exchange efficiency.

Preferably, the distributor further comprises at least one feeding unit to feed a thermoregulating fluid, the feeding unit being equipped with ducts and nozzles which can be constrained to a thermoregulating fluid flow regulator, for example an external regulator. The feeding unit can be coupled with a modular unit of the distributor to feed the coils. This solution advantageously allows to be able to activate the flow regulator from outside of the distributor, in a simpler way with respect to the past.

Preferably, the sleeves have frontal through holes through which the relative coil is set in fluid communication with a circulation circuit of a thermoregulating fluid inside the distributor or with another coil of an adjacent sleeve. This detail allows to create complex circulation circuits of the thermoregulating fluid inside the distributor.

For example, the distributor can be achieved with a circulation circuit of the thermoregulating fluid consisting of the coils and the corresponding ducts inside the modular elements connected to the coils, for example ducts obtained by drilling the modular units or the connection elements described above.

Preferably, the distributor further comprises at least one flow regulator of the melted rubber, i.e. a regulator of the melted rubber flow rate inside corresponding distribution channels. The regulator can be activated by the user so that to ensure that the melted rubber contemporaneously reaches all of the nozzles of the distributor, thus traveling at the same speed through all the branches of the distribution channels.

In the preferred embodiment, the flow regulator of the melted rubber comprises one or more intercepting elements insertable at corresponding lengths of the distribution channels, in a calibrated way, i.e. with a precise and selective regulation of the position of each intercepting element. For example, the intercepting elements are screwable to reduce the passage section of the corresponding intercepted length of a distribution channel. By acting selectively on each of the intercepting elements, the user can thus regulate the flow rate of the melted rubber inside the distribution channels, until obtaining the desired operation.

A second aspect of the present invention concerns a cold runner block for rubber injection molds comprising the distributor described above. The second aspect of the present invention thus concerns an assembly formed by the distributor described above and by a cold runner block configured to house the distributor.

The cold runner block comprises at least two plates that can be coupled to one another and defining an inner housing in-between them and in which the distributor according to any one of the preceding claims can be removably inserted, i.e. interchangeably, with the nozzles accessible from the outside, to be turned towards the mold.

As mentioned above, the great advantage of this solution consists in the fact of being able to implement a light and compact distributor, easy to manage and maintain, leaving the task of carrying out the role of mass which must have thermal inertia to the plates, considering that the plates are not subject to getting dirty and do not have to be replaced or cleaned, i.e. they do not cause problems for the maintenance.

Preferably, the cold runner block is made with plates which constitute 80-90% of the total weight of the cold runner block, whereas the distributor constitutes 10-20% of the total weight of the cold runner block.

For example, the plates can be screwed to one another, with few screws, and can be separated to allow the removal or replacement of the distributor.

Preferably, the plates of the cold runner block are drilled to allow the insertion of a maneuvering tool of the intercepting elements of the flow regulators of the distributor from the outside. This configuration advantageously allows to regulate the flow rates of the melted rubber in each branch of the distribution channels of the distributor, without having to separate the plates to access the distributor, but maintaining the cold runner block closed and operative.

A third aspect of the present invention, for which the Applicant reserves the right to file a divisional patent application, concerns a connection element of a rubber distributor for injection molds, also with a cap function.

In particular, the connection element comprises a portion insertable in the distributor to intercept a distribution channel of the melted rubber. A through hole is obtained in the insertable portion to allow the passage of the melted rubber and to engage, and extract from the distributor, any tubular element of cured rubber generated in the distribution channel.

BRIEF LIST OF THE FIGURES

Further characteristics and advantages of the invention will be better highlighted by the review of the following detailed description of a preferred, but not exclusive, embodiment illustrated by way of example and without limitations, with the aid of the accompanying drawings, in which:

FIG. 5 is a sectional horizontal view of the cold runner block shown in FIG. 1;

FIG. 6 is an enlargement of the part circled in FIG. 5;

FIG. 7 is a sectional view of the cold runner block shown in FIG. 1 considered on the longitudinal vertical plane X-X;

FIG. 8 is an enlargement of the part circled in FIG. 7;

FIG. 9 is a sectional view of the cold runner block shown in FIG. 1 considered on the transverse vertical plane X-X;

FIG. 10 is a front view of a first component of the distributor shown in FIGS. 1 and 2;

FIGS. 11 and 12 are sectional views of the first component shown in FIG. 10;

FIG. 13 is a front view of a second component of the distributor shown in FIGS. 1 and 2;

FIGS. 14 and 15 are sectional views of the second component shown in FIG. 13.

DETAILED DESCRIPTION OF THE INVENTION

FIGS. 1-15 show a cold runner block 1 according to the present invention and the relative accessories and components.

Figure 1:
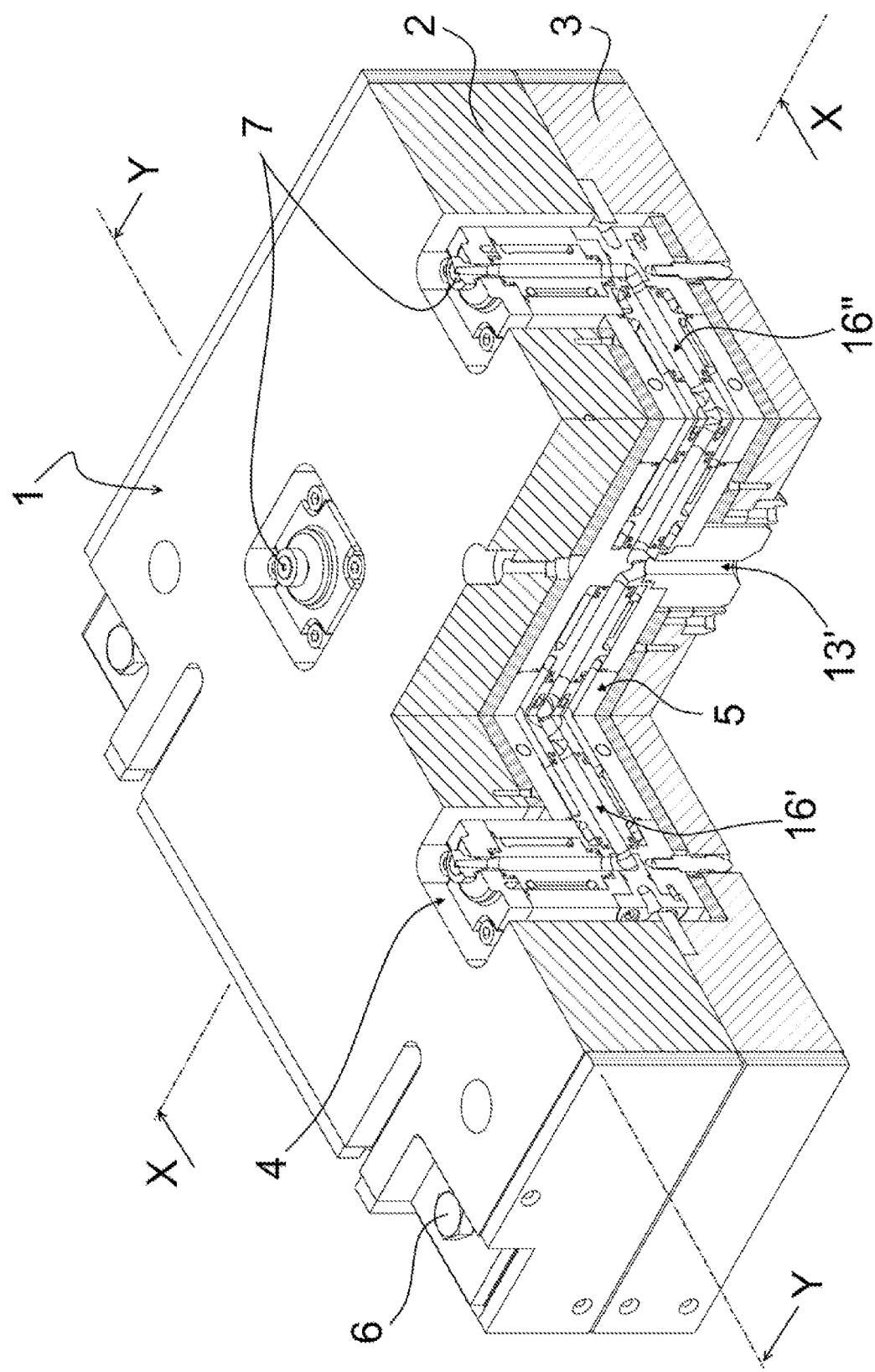
FIG. 1 is a perspective and sectional vertical view of a cold runner block for injection molds equipped with a thermoregulated rubber distributor according to the present invention.

In particular, FIG. 1 shows in perspective, and in partial section, a cold runner block 1 comprising two metal plates 2 and 3, for example made of steel, which can be stacked one on the other. When the upper plate 2 and the lower plate 3 are stacked, as shown in FIG. 1, they define an inner housing 4 in which a distributor 5 according to the present invention finds space. In practice, the plates 2 and 3 define a metal sarcophagus in which a distributor 5 of the melted rubber can be interchangeably housed.

The two plates 2 and 3 can be coupled with screws 6 and can thus be separated easily to open the inner housing 4 and to access the distributor 5 to replace or subject it to maintenance.

The cold runner block 1 is intended to be installed on board of a press together with an injection mold for rubber.

The nozzles 7 of the distributor 5 are thus accessible on the upper face of the plate 2, and protrude therefrom, to allow the fluid connection with the inside of the mold. In particular, the nozzles 7 are intended to go abut against one of the two mold halves, at similar nozzles, to allow the passage of the melted rubber from the distributor 5 towards the inside of the closed mold (not shown for simplicity).

In the distributor 5, there are channels 16', 16" for the distribution of the melted rubber from an inlet 13' to the nozzles 7.

Figure 2:
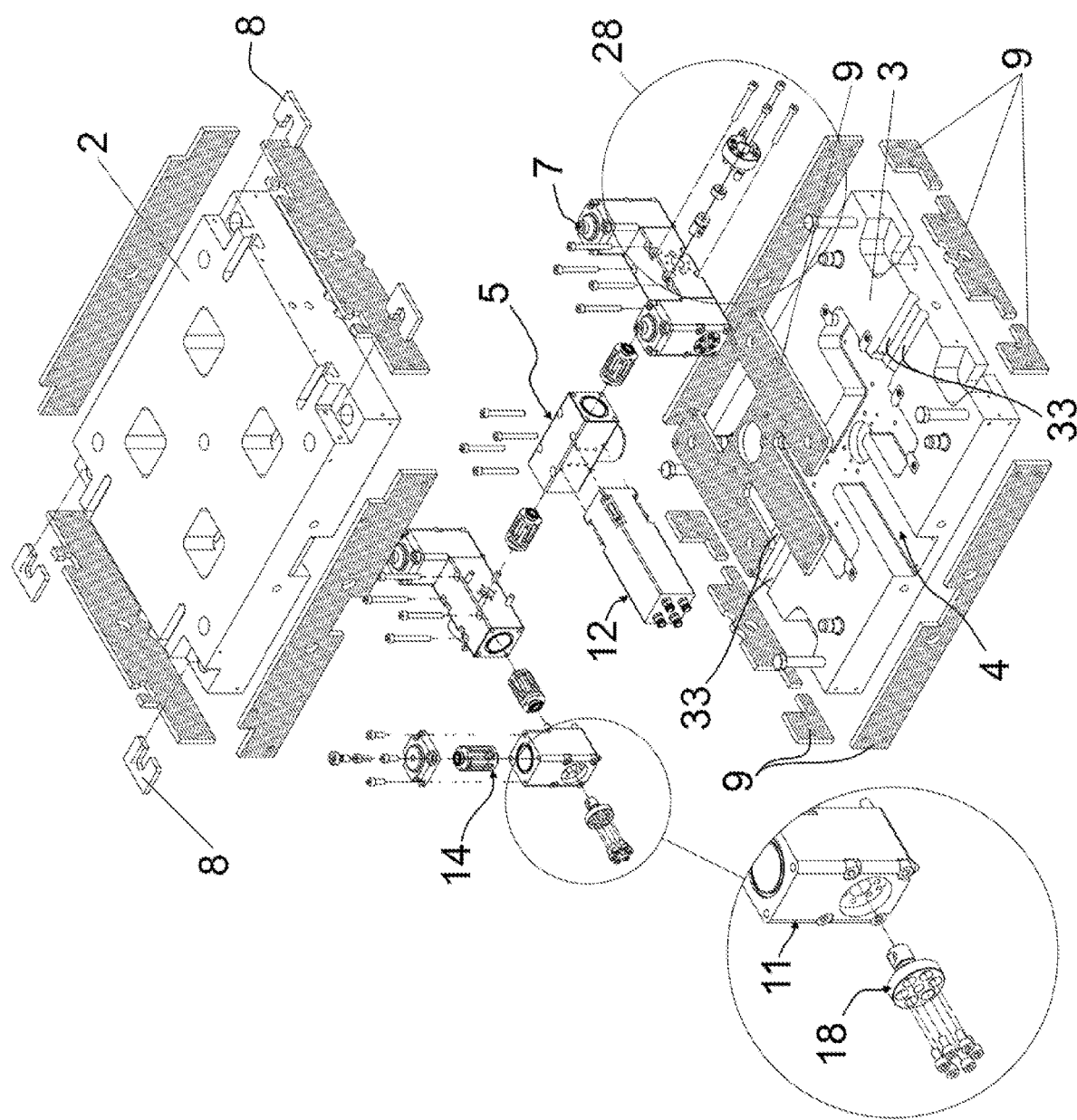
FIG. 2 is an exploded view of the cold runner block and the distributor shown in FIG. 1.

FIG. 2 is an exploded and perspective view of the cold runner block 1 shown in FIG. 1, including the interchangeable distributor 5.

Quick release brackets of the plates 2 and 3 are denoted by the reference 8. The reference 9 globally denotes thermally insulating inserts or gaskets, on the sides or interposed in-between the plates 2 and 3.

As clearly visible in the example shown, the housing 4 has a generic H shape and is milled from solid inside the plates 2 and 3. The distributor 5 is simply inserted in the housing 4 and closed sandwich-like in-between the plates 2 and 3.

Figure 3:
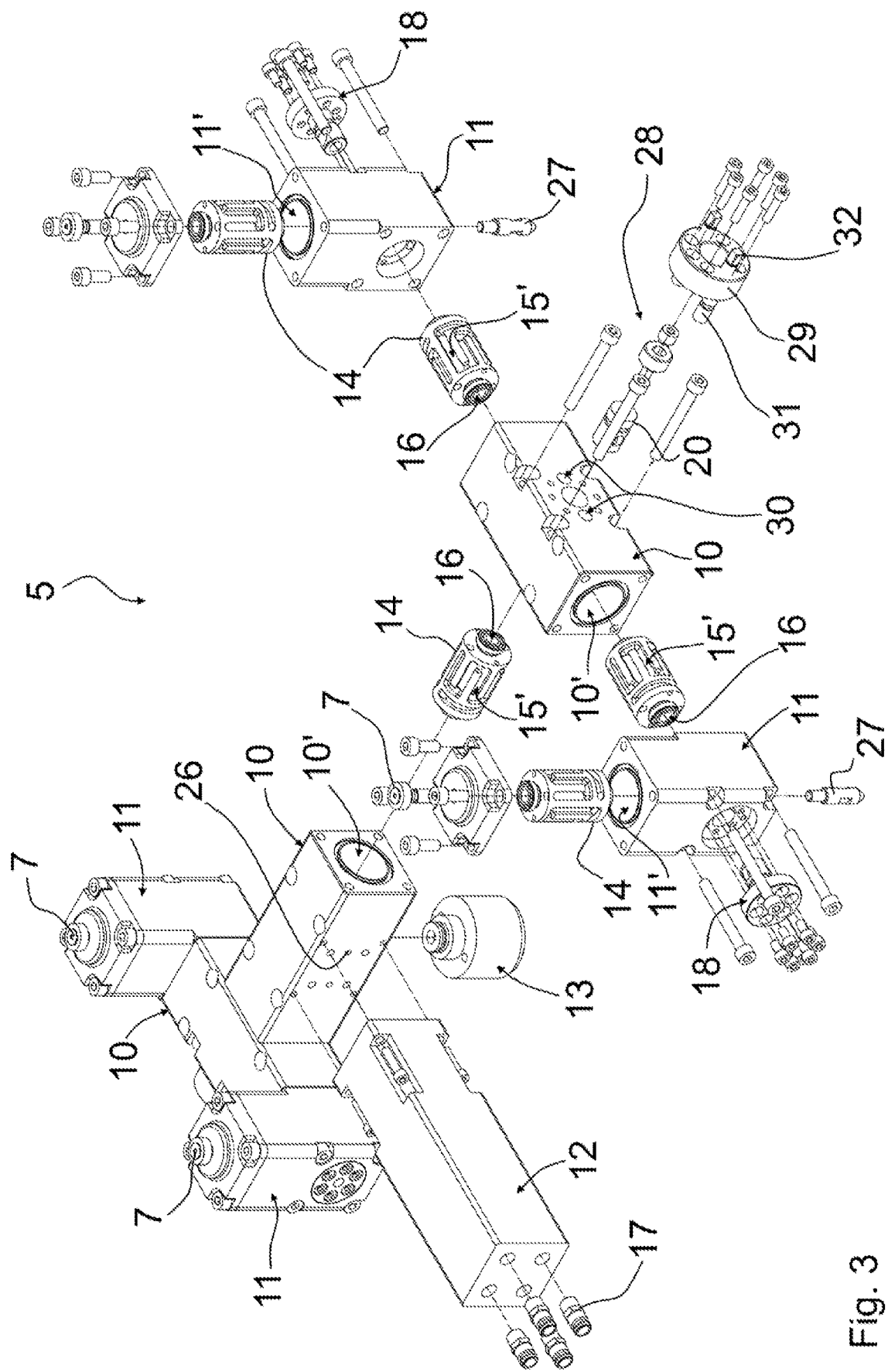
FIG. 3 is an exploded view of only the thermoregulated rubber distributor according to the present invention.

FIG. 3 only shows the distributor 5 in an exploded view. Unlike known solutions, the distributor 5 is not a single solid piece obtained from solid or obtained by fusion and successive mechanical machining, but is constructed by assembling a plurality of modular units 10-11 with other units 12 and 13, as will now be described.

Each unit 10-11 is a component, for example a steel parallelepiped, which comprises a channel length 16', 16" for the distribution of the melted rubber therein; in other words each unit 10-11 is hollow and, by joining several units 10-11 to one another, the inner cavities of the various units 10-11 are set in fluid communication and a channel 16', 16" for the distribution of the melted rubber is achieved depending on the desired path. In particular, the channel distribution length 16' inside the units 10 is rectilinear and the channel distribution length 16' inside the units 11 is curved, for example defines a 90° curve. This way, by assembling the units 10-11, it is possible to define the desired path for the melted rubber, comprising rectilinear and curved lengths, up to a nozzle 7.

In the example shown in the figures, the units 10 are rectilinear and the units 11 define 90° curves, however, in general, the present invention can also be implemented by using units with 60°, 120° curves and/or units of different lengths. The reference 12 denotes the liquid feeding unit of the thermoregulating system, whose operation will be described hereinafter. The reference 13 denotes a nozzle which acts as an interface for the injector feeding the rubber from the auger combined with the mold.

By having storage of units 10-11 available, it is possible to assemble the rubber distributor 5 from time to time, avoiding an ex novo design, and avoiding long and costly mechanical machining of single metal pieces. In the example shown in the figures, the units 10-13 are screwable one to another in different combinations.

More in detail, the units 10-11 have an inner housing 10', 11', in practice a hole in which a bushing 14 is inserted. A groove 15' is obtained on the outer surface of the bushings 14, for example by milling, and whose task is to make the fluid of the thermoregulating system circulate. In the example shown, the groove 15' develops according to a fret-like path, between an initial point (fluid inlet) and a final point (fluid outlet). The inner diameter of the housing 10', 11' is substantially complementary to the outer diameter of the bushing 14, and thus the groove 15' is limited in radial direction from the inner surface of the relative housing 10', 11', i.e. together, the inner surface of the relative housing 10', 11' and the groove 15' form a coil 15 for the circulation of the fluid of the thermoregulating system around the sleeve 14. By exchanging heat with the outer surface of the sleeve 14, the thermoregulating fluid maintains the sleeve 14 itself at the desired temperature.

The reference 15" denotes holes made frontally in the sleeves 14 to set the groove 15', and thus the coil 15, in fluid communication with other lengths of a thermoregulating fluid circuit inside the distributor 5.

As can be noted in FIG. 3, the bushings 14 can be easily inserted in the corresponding units 10 and 11 while assembling the distributor 5, and can also be easily extracted for their cleaning or replacement.

The bushings 14 in turn have a longitudinal through hole 16 extending along the geometric axis of the sleeve 14: once the bushing 14 has been inserted in the relative unit 10 or 11, the through hole 16 inside the bushing 14 constitutes the length of a channel 16' or 16" for the distribution of the melted rubber inside the distributor 5. The coil 15 thus extends radially on the outside of the through hole 16, i.e. surrounds it. This way, the thermoregulating fluid circulating in the coil 15 exchanges heat with the bushing 14 itself and with the melted rubber therein, avoiding its vulcanization. Thanks to the presence of the holes 15", all of the coils 15 are connected and form a thermoregulating fluid circulation circuit C, inside the distributor 5, which surrounds the distribution channels 16' and 16" along their whole extent (FIG. 9).

In substance, by assembling the units 10-13 like construction bricks, and by having obtained the groove 15' on the extractable and interchangeable bushings 14, the rubber distributor 5 is constructed with the desired numbers and shapes of the distribution channels 16', 16", where each complete channel 16', 16" is defined by the through holes 16 of several bushings 14.

Inside the units 10, 11, the bushings 14 can be stacked so that to lean in head to head contact and to give continuity to the inner channels 16, i.e. to form a continuous channel 16', 16", etc. for the distribution of the melted rubber, or an interstice, or an elbow-like element defining a curve, as will be explained hereinafter, may be present in-between two bushings 14.

Preferably, as shown in FIG. 3, the sleeves 14 occupy most of the volume of the relative modular unit 10, 11. The modular units 10, 11 substantially are parallelepiped metal cables: the diameter of the hole 10', 11', in which the sleeve 14 is housed, is equal to at least half of the length of the diagonal of the cross-section of the modular unit 10, 11. In other words, the thickness between the housing 10', 11' of the sleeves 14 and the outer surface of the modular unit 10, 11 is smaller than the radius of the housing. This detail makes it so that the thickness of modular units 10, 11, i.e. the distance between the hole 10', 11' and the outer surface of the modular unit 10, 11, is minimum. In fact, the thermal inertia is assigned to the plates 2 and 3; these plates must accumulate heat to avoid subjecting the rubber to undesired thermal transients while molding. The distributor 5 according to the present invention is deliberately "lean" to be easily replaceable, disassembled and cleaned, and to be light. In fact, the plates 2 and 3, which contain the distributor 5, must not be cleaned and transported as often as the distributor 5. In the example shown in the accompanying figures, the plates 2 and 3 constitute about 90% of the weight of the cold runner block 1 and the distributor 5 only constitutes 10%.

Moreover, minimizing the weight of the distributor 5 by using modular units 10, 11 of small dimensions allows to ship a spare modular unit 10, 11 at a low cost, worldwide.

As mentioned above, the feeding unit 12 comprises nozzles 17 that can be connected to outside circulation lines of the thermoregulating liquid (inlet and outlet). The thermoregulating unit can be cooled. The thermoregulating liquid passes from the unit 12 to another unit 10 by means of holes 26 which give access to the coil 15 defined by the sleeve 14 inserted in that unit 10.

The operation of the distributor 5 is simple. Once the distributor 5 has been assembled to give shape to one or more channels for the distribution of the melted rubber, depending on the desired paths and lengths, the rubber is injected through the nozzle 13, in particular in the passage 13' visible in FIG. 1, in the inner channels 16 of the sleeves 14 defining, together, the channels 16' for the distribution of the melted rubber, and from here reaching the nozzles 7 which are inserted inside the mold; contemporaneously, the thermoregulating liquid is circulated in the coils 15 to maintain the melted rubber at the correct temperature in the distribution channels 16', 16".

When it is necessary to clean the distributor 5, it is sufficient to extract it from the cold runner block, to disassemble it by unscrewing the units 10-13, to pull out the sleeves 14 and to clean (at this point very easily) the single units 10-13 before reassembling everything. As an alternative, given the low manufacturing cost of the distributor 5 with respect to a solution made in one piece, it is possible to have two identical distributors 5, so that the distributor 5 to be cleaned is immediately replaced in the cold runner block with the spare distributor 5 to limit the production down time to minimum, and the replaced distributor 5 can thus be cleaned and fine-tuned to act as a spare distributor 5 for a successive replacement.

It is clear that, by being able to access the single lengths 16 of the channels 16' for the distribution of the melted rubber, the relative cleaning is particularly simple, also without using abrasive tools or techniques, such as sandblasting, which wears out the surfaces.

The modular structure of the distributor 5 allows to achieve distribution channels 16', 16" as desired, and to easily maintain them clean. Moreover, also if a length of a duct 16', 16" for the distribution of the melted rubber should somehow be damaged, or if the rubber should be vulcanized therein by mistake, it is sufficient to replace the corresponding modular unit 10-11 to be able to restore the correct operations of the distributor 5, without having to replace the whole distributor.

The reference 27 denotes a dowel pin of the distributor 5 with respect to the lower plate 3 of the cold runner block 1.

Figure 4:
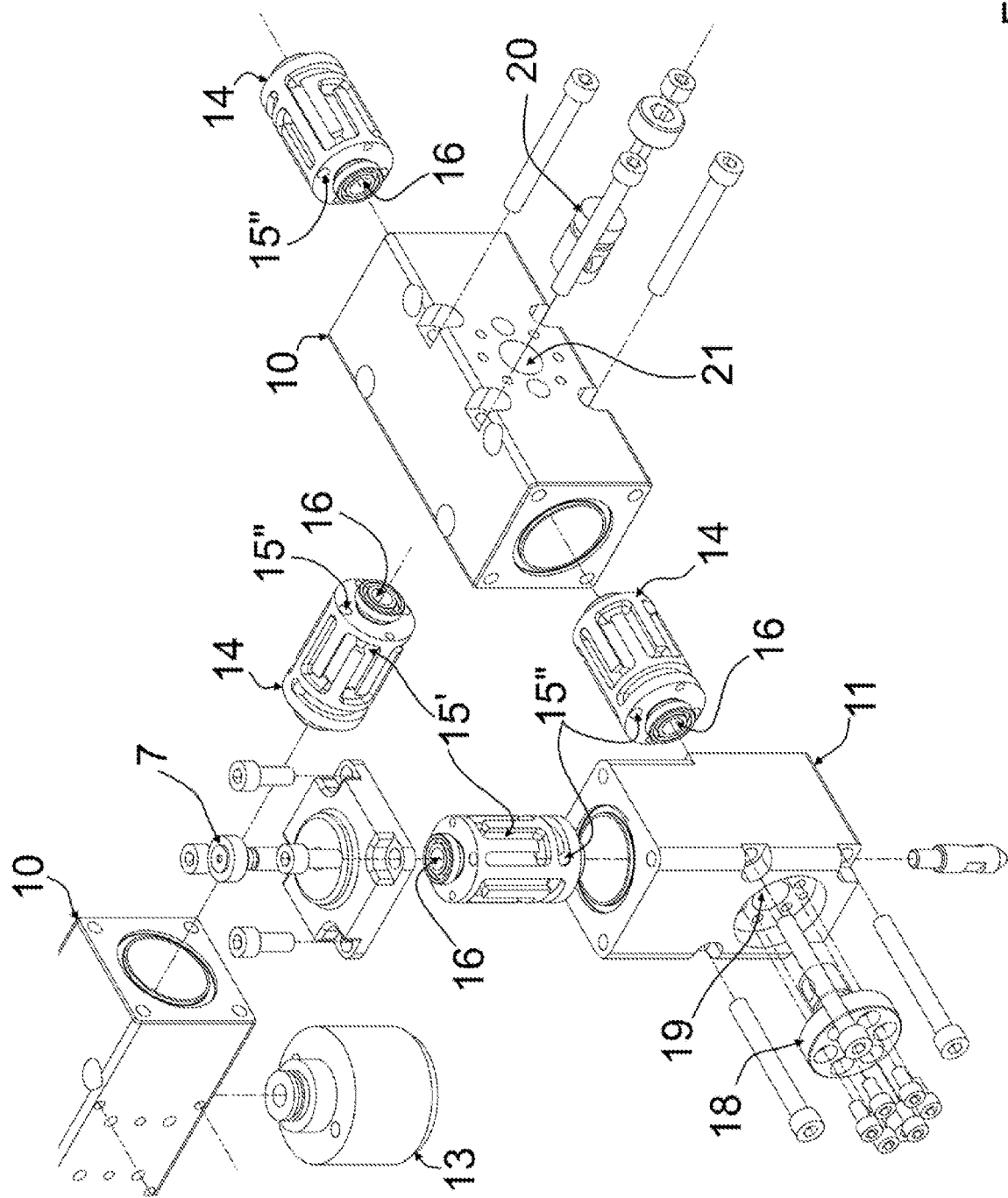
FIG. 4 is an enlargement of a part of FIG. 3.

FIG. 4 is an enlargement of a part of FIG. 3. The reference number 18 denotes a connection element which acts to intercept a hole 19 of the unit 11 to prevent the melted rubber from coming out of the distribution channel 16', 16". In substance, the connection element 18 is a cap of the unit 11. Moreover, the cap 18 also acts to define a curve in a corresponding length of the distribution channel 16" inside the unit 11, as will be explained hereinafter. In fact, in the unit 11, the distribution channel 16' is vertical at the nozzle 7 and horizontal at the interface with the unit 10.

Also, the element 20 is a connection element which acts also as a cap that intercepts a corresponding hole 21 obtained through the side wall of the unit 10; the hole 21 gives access to the channel 16".

As will become clear, the great advantage offered by the connection elements (or caps) 18 and 20 consists in the fact that they allow to pull out a solidified-rubber tubular element T from the corresponding distribution channel 16', 16" inside the distributor 5, effortlessly.

FIG. 5 is a sectional view of the cold runner block 1 completely assembled, considered on an intermediate horizontal plane in-between the plates 2 and 3, in which the two distribution channels 16' and 16", respectively left and right, are well shown and which in turn divide into two branches each leading to a nozzle 7, defining an H path. The channels 16' and 16" start from the center of the distributor 5 at the injector 13. As can be noted, the section shows six sleeves 14 to which four vertical sleeves 14 (not shown in this figure) leading to the four nozzles 7 has to be added.

FIG. 6 is an enlargement of the circled part of FIG. 5; it is the enlargement of the connection element/cap 20, screwed and positioned correctly in the unit 10. As can be noted, the cap 20 comprises a protruding portion 21 which is inserted in the unit 10 until intercepting the corresponding distribution channel 16". The channel 16" is not occluded but remains open, by virtue of the fact that the protruding part 21 of the cap 20 is drilled. In the example shown, the hole 22 obtained in the protruding part 21 is T-shaped to connect the three lengths of the distribution channel 16" to one another. With this configuration, the hole 22 acts as an eyelet when the cap 20 is unscrewed: any tubular element of cured rubber that remained in the lengths of the distribution channel 16" engages the eyelet and is thus pulled out of the unit 10 when the cap 20 is unscrewed. The cap 18 also boasts this characteristic.

FIG. 7 is a sectional view of the cold runner block 1 considered on a vertical plane crossing the axis Y-Y shown in FIG. 1. The distribution channel 16' which branches off into two vertical lengths that feed the nozzles 7 is shown. Four sleeves 14, the relative coils 15 defined together with the inner part of the units 10 and 11 and two caps 18 which define an elbow fitting, i.e. at 90°, which fluidically connects a horizontal length of the channel 16' in the unit 10 to a vertical length of the channel 16' itself in the unit 11, are also shown. FIG. 8 is an enlargement of the circled part of FIG. 7, which shows the cap 18 in detail. Similarly, to the cap 20, the cap 18 also comprises a protruding portion 23 which fits into the corresponding unit 10; a hole 24 which defines the 90° elbow fitting is obtained in the protruding portion. For example, during the implementation, it is sufficient to make two orthogonal holes in the protruding part 23. With this detail, the removal of the rubber agglomerates from the inside of the distribution channel 16' is extremely easy and quick: it is sufficient to unscrew the cap 18 and the tubular element T of cured rubber, which engages the hole 24 as a rope in a fairlead, is pulled out.

FIG. 9 is a sectional view of the cold runner block 1 considered on a vertical plane crossing the axis X-X shown in FIG. 1. In this view, the caps 20 and the relative holes 22 are well visible.

A thermocouple 25 is inserted in the upper plate 25 to detect its temperature and to transmit a corresponding signal to the outer control unit.

As can be noted by observing the sectional views of FIGS. 5-9, when the distributor 5 of the melted rubber is correctly assembled, the distribution channels 16' and 16" develop without interruptions: the sleeves 14 are sealingly in abutment (with apposite O-rings if necessary), head to head, against the caps 18, 20 or the nozzles 7, so that the rubber cannot come out of the same distribution channels 16' and 16" and spill out in other parts of the distributor 5 or outside thereof.

FIGS. 10-12 only show the cap 18 separated from the cold runner block 1. In particular, view 10 shows the cap 18 frontally and the views 11 and 12 are sections respectively considered on the planes B-B and A-A of FIG. 10. The protruding part 23 and the through hole 24 through which the melted rubber flows and which is used to pull a tubular element T when it forms in the distribution channel 16', 16" are well shown. In FIG. 12, a tubular element T of cured rubber which was pulled out from the distributor 5 by unscrewing the cap 18 is schematized: in fact, the tubular element T straddles the hole 24.

FIGS. 13-15 only show the cap 20 separated from the cold runner block 1. In particular, view 13 shows the cap 20 frontally and the views 14 and 15 are sections respectively considered on the planes B'-B' and A-A' of FIG. 13. The protruding part 21 and the through hole 22 through which the melted rubber flows and which is used to pull a tubular element T when it forms in the distribution channel 16', 16" are well shown.

The caps 18, 20 may also be used in cold runner blocks according to the known art, and for this reason the Applicant reserves the right to file a divisional patent application aimed to only protect the caps 18, 20.

Still considering FIGS. 2 and 3, the reference 28 denotes a flow regulator of the melted rubber flowing inside the distribution channel 16". The ring nut 29 is screwed to a modular unit 10 and two intercepting elements 31 provided with a polygonal head 32 that can be engaged with a tool are mounted thereon. When the ring nut 29 is correctly screwed to the corresponding modular unit 10, the intercepting elements 31 are inserted in corresponding holes 30 for the insertion in one of the branches of the distribution channel 16", where the melted rubber flows. The more an intercepting element 31 is screwed in the relative hole 30, the more the passage available for the melted rubber in the channel 16" narrows; vice-versa, the more the intercepting element 31 is unscrewed from the relative hole 30, the greater availability of passage for the melted rubber. In other words, the intercepting elements 31 act as faucets. In the example shown in the figures, the intercepting elements are cylindrical and outwardly threaded to mesh corresponding holes of the ring nut 29.

In FIG. 2, the holes 33 obtained through the thickness of the plates 2 and 3 are visible. The holes 33 allow to access the inner housing 4 in which the distributor 5 is positioned from the outside, with a maneuvering tool, for example with a hexagon T wrench. By inserting the tool through a hole 33, it is possible to engage the polygonal head 32 of an intercepting element 31 to screw it in the hole 30 or to unscrew it therefrom, and to correspondingly regulate the flow rate of the rubber flowing in the distribution channel 16".

In the example shown in the figures, there are four holes 33, the same is also valid for the intercepting elements 31; this allows to accurately and selectively regulate the flow rate of the melted rubber in each branch of the distribution channels 16', 16" to ensure that the melted rubber reaches the nozzles 7 contemporaneously.

The invention claimed is:

1. A thermoregulated rubber distributor (5) for injection molds, the distributor comprising:
    two or more modular units (10, 11), a plurality of sleeves (14) each interchangeably insertable in the two or more modular units (10, 11), one or more injectors (13) to feed melted rubber to the distributor (5) and one or more discharge nozzles (7) to discharge the melted rubber from the distributor (5) towards an external mold, wherein each of the plurality of sleeves (14) has a through hole (16) extending along a longitudinal axis of said each of the plurality of sleeves (14) and a groove (15') extending on a side surface of each of the plurality of sleeves so that the groove (15') and an inner surface of the two or more modular units (10, 11) define a coil (15) intended to be supplied with a thermoregulating fluid whenever each of the plurality of sleeves (14) is inserted into two or more modular units (10, 11), wherein the two or more modular units (10, 11) can be constrained to one another to define one or more channels (16', 16") for distribution of the melted rubber that extend from an injector (13) to one or more discharge nozzles (7), depending on a desired path, and wherein the through hole (16) of each of the plurality of sleeves (14) defines corresponding lengths of at least one of the one or more channels (16', 16") for distribution of the melted rubber; and wherein at least one sleeve (14) has a frontal through hole (15") through which the relative coil (15) is set in fluid communication with another coil (15) of an adjacent sleeve (14) or with a corresponding duct provided in the related modular unit (10, 11).

2. The distributor (5) according to claim 1, comprising at least one connection element (18, 20) provided with a portion (21, 23) insertable in a modular unit (10, 11) in-between two of the plurality of sleeves (14), wherein a through hole (22, 24) is obtained in the insertable portion (21, 23) to set two subsequent through holes (16) of two of the plurality of sleeves (14) in fluid communication.

3. The distributor (5) according to claim 2, wherein the at least one connection element (18, 20) is a sealingly screwable cap of a modular unit (10, 11) to prevent the melted rubber from coming out of the distributor (5), and which can be unscrewed from the modular unit (10, 11) to extract any tubular cured rubber element (T) formed in a corresponding intercepted distribution channel (16', 16").

4. The distributor (5) according to claim 2, wherein the through hole (22, 24) of the at least one connection element (18, 20) is rectilinear, or defines a curve to connect a non-aligned through holes (16) of one of the plurality of sleeves (14).

5. The distributor (5) according to claim 2, wherein the extension of the insertable portion (21, 23) of the at least one connection elements (18, 20) is negligible with respect to an extension of the one or more distribution channels (16', 16") inside the distributor (5) that are defined by the through holes (16) of each of the plurality of sleeves (14), so that the one or more distribution channels (16', 16") of the melted rubber are thermoregulated throughout most of the extension.

6. The distributor (5) according to claim 1, wherein the groove (15') extends over an outer surface of each of the plurality of sleeves (14), defining a fret-like path that substantially covers all of the surface of the sleeve (14), between an initial and final point, and wherein the two or more modular units (10, 11) have a housing (10', 11') in which at least one of the plurality of sleeves (14) is insertable removably, and the groove (15') and inner surface of the housing (10', 11') define said coil (15), and a thermoregulating fluid that exchanges heat with each of the plurality of sleeves (14) is fed at said initial point and collected at said final point.

7. The distributor (5) according to claim 1, wherein the plurality of sleeves (14) are substantially cylindrical and hollow and provided with sealing gaskets on each respective end.

8. The distributor (5) according to claim 1, wherein the two or more modular units (10, 11) are parallelepiped-shaped and each has an inner housing (10', 11') in which each the plurality of sleeves (14) is housed, a relative thickness between the inner housing (10', 11') of the plurality of sleeves (14) and the outer surface of the modular unit (10, 11) is smaller than a radius of the each inner housing (10', 11').

9. The distributor (5) according to claim 1, comprising a feeding unit (12) to feed the thermoregulating fluid, the feeding unit being equipped with ducts and nozzles (17) constrained to a thermoregulating fluid flow regulator, wherein the feeding unit (12) can be coupled to a modular unit (10, 11) to feed at least one coil (15).

10. The distributor (5) according to claim 1, wherein the plurality of sleeves (14) have front holes (15") through which a relative coil (15) is in fluid communication with a circulation circuit (c) of the thermoregulating fluid inside the distributor (5).

11. The distributor (5) according to claim 1, comprising a thermoregulating fluid circulation circuit (c) consisting of at least one coil (15) and corresponding ducts inside the modular units (10, 11) connected to the at least one coil (15).

12. The distributor (5) according to claim 1, comprising a flow rate regulator (28) of the melted rubber in at least one distribution channel (16', 16"), and the flow rate regulator (28) in turn comprising at least one intercepting element (31) that can be actuated by a user and insertable in a corresponding length of one or more distribution channel (16', 16") to reduce a section thereof.

* * * * *